US012801352B2

(12) United States Patent
Lakshmi Narayanan et al.

(10) Patent No.: US 12,801,352 B2
(45) Date of Patent: Nov. 17, 2026

(54) METHOD AND SYSTEM FOR CODE GENERATION VIA SKILL DISTILLATION AND COMPOSITION BY LARGE LANGUAGE MODEL

(71) Applicant: JPMorgan Chase Bank, N.A., New York, NY (US)

(72) Inventors: Annapoorani Lakshmi Narayanan, New York, NY (US); Yuchen Xiao, Jersey City, NJ (US); Deepeka Garg, London (GB); Leo Ardon, London (GB); Jared Vann, London (GB); Mengda Xu, Jersey City, NJ (US); Udari Madhushani Sehwag, Jersey City, NJ (US); Sumitra Ganesh, Short Hills, NJ (US); Manuela Veloso, New York, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 288 days.

(21) Appl. No.: 18/652,302

(22) Filed: May 1, 2024

(65) Prior Publication Data

US 2025/0342012 A1 Nov. 6, 2025

(51) Int. Cl.
*G06F 8/30* (2018.01)
*G06F 8/36* (2018.01)
(Continued)

(52) U.S. Cl.
CPC .................. *G06F 8/31* (2013.01); *G06F 8/30* (2013.01); *G06F 8/36* (2013.01); *G06F 11/3688* (2013.01);
(Continued)

(58) Field of Classification Search
CPC ..... G06F 8/30; G06F 8/31; G06F 8/36; G06F 40/20; G06N 20/00
See application file for complete search history.

(56) References Cited

U.S. PATENT DOCUMENTS

2024/0028312 A1* 1/2024 Gillman .................... G06F 8/35
2024/0281219 A1* 8/2024 Masad ....................... G06F 8/33
2025/0021769 A1* 1/2025 Buckley .................... G06F 8/30

OTHER PUBLICATIONS

Cai, Yuzhe, et al., Low-code LLM: Visual Programming over LLMs, Apr. 2023, 14 pages, [retrieved on Apr. 2, 2026], Retrieved from the Internet: <URL:https://www.researchgate.net/publication/370070790_Low-code_LLM_Visual_Programming_over_LLMs>.*

* cited by examiner

*Primary Examiner* — Geoffrey R St Leger
(74) *Attorney, Agent, or Firm* — Greenblum & Bernstein, P.L.C.

(57) ABSTRACT

A method and a system for using a large language model (LLM) to automatically translate textual instructions into executable software code via skill distillation and composition are provided. The method includes: receiving a request for performing a task and a prompt; providing, as an input to an LLM, the first request and a response to the prompt; receiving, from the LLM, a set of code that implements a function that corresponds to a skill that is usable for performing the task; generating a test that relates to the task; performing the test by executing the set of code and checking whether the task has been successfully completed; and when the task has been successfully completed, storing the set of code in a skills library. Sets of code stored in the skills library may then be accessed and combined in order to perform larger tasks.

13 Claims, 6 Drawing Sheets

(51) Int. Cl.
*G06F 11/3668* (2025.01)
*G06F 40/20* (2020.01)
*G06N 20/00* (2019.01)

(52) U.S. Cl.
CPC .......... *G06F 11/3692* (2013.01); *G06F 40/20* (2020.01); *G06N 20/00* (2019.01)

600

METHOD AND SYSTEM FOR CODE GENERATION VIA SKILL DISTILLATION AND COMPOSITION BY LARGE LANGUAGE MODEL

BACKGROUND

1. Field of the Disclosure

This technology generally relates to methods and systems for generating software code, and more particularly to methods and systems for using a large language model to automatically translate textual instructions into executable software code via skill distillation and composition.

2. Background Information

Standard Operating Procedure (SOP) tasks involve highly specific, repetitive actions with known outputs and exceptions, which are meticulously documented in a step-by-step manner. These documents serve as an extensive repository of knowledge, encompassing all processes and tasks relevant to the field. A deep understanding of these documents is crucial for all team members engaged in this line of work. However, it is often inefficient for employees to locate information related to their tasks and manually interact with internal UI systems to finish them. Employee attrition further exacerbates this issue of knowledge transfer and sharing, as expertise is lost and must be rebuilt.

In this aspect, it is desirable to empower operations employees to enhance their productivity and advance up the value chain by swiftly finding solutions to address standard/known exceptions and contribute solutions to new problems; ensure resilience to attrition and expedite the onboarding of new employees; and provide adequate support and streamline these processes for system users.

The use of large language models (LLMs) has become widespread in recent years, as they often provide a very expeditious way to generate a desired output, such as a textual output or an image/pictorial output. One popular use for LLMs is to generate software code. In view of the above, there is a need for a framework that utilizes LLMs to automatically translate textual instructions into executable code that corresponds to skills, while interacting with users to apply these generated skills in solving operational tasks.

SUMMARY

The present disclosure, through one or more of its various aspects, embodiments, and/or specific features or sub-components, provides, inter alia, various systems, servers, devices, methods, media, programs, and platforms for using an LLM to automatically translate textual instructions into executable software code via skill distillation and composition.

According to an aspect of the present disclosure, a method for automatically generating software code is provided. The method is implemented by at least one processor. The method includes: receiving, by the at least one processor, a first request for performing a first task and a first prompt that includes at least one from among application programming interface (API) information and at least one pre-defined helper function; providing, by the at least one processor as an input to a first large language model (LLM), the first request and a response to the first prompt that is received via a user interface (UI); receiving, by the at least one processor from the first LLM, a first set of executable code that implements a first function that corresponds to a skill that is usable for performing the first task; generating, by the at least one processor, a first test that relates to the first task; performing the first test by executing the first set of executable code and checking whether the first task has been successfully completed; and when the first task has been successfully completed, storing the first set of executable code as a skill in a skills library.

The method may further include: receiving a second request for performing a second task; providing, as an input to the first LLM, the second request, together with at least one skill from among the skills stored in the skills library; receiving, from the first LLM, a second set of executable code that is usable for performing the second task; generating, by the at least one processor, a second test that relates to the second task; performing the second test by executing the second set of executable code and checking whether the second task has been successfully completed; and when the second task has been successfully completed, storing the second set of executable code as a solution in a solutions library.

The method may further include: displaying, via the UI, a list of available solutions that are stored in the solutions library; receiving, from a user via the UI, a third request to execute at least one user-selected solution from among the displayed list of available solutions; retrieving instructions that correspond to the at least one user-selected solution; prompting, based on the instructions, the user to provide at least one input that corresponds to at least one item of information required for executing the at least one user-selected solution; receiving the at least one input from the user via the UI; executing the at least one user-selected solution by using the at least one input; and transmitting, to the user, a result of the executing of the at least one user-selected solution.

The method may further include calling at least one standard operating procedure (SOP) tool from among a first SOP tool that corresponds to obtaining information that relates to the list of available solutions that are stored in the solutions library; a second SOP tool that corresponds to retrieving a set of executable code that corresponds to a selection from the list of available solutions; a third SOP tool that corresponds to obtaining a description, a set of instructions, and a set of required input parameters that correspond to the selections from the list of available solutions; and a fourth SOP tool that corresponds to executing the set of executable code that corresponds to the selection from the list of available solutions.

The method may further include calling at least one UI tool from among a first UI tool that corresponds to displaying a file upload form via the UI and retrieving an uploaded file based on a response to the displaying of the file upload form; a second UI tool that corresponds to displaying a file download button via the UI and receiving a notification that a file has been downloaded by the user; a third UI tool that corresponds to prompting the user to provide required inputs via the UI; and a fourth UI tool that corresponds to displaying an error message via the UI.

The API information may include at least one from among an API description, a GET API method type, a POST API method type, an API uniform resource locator (URL), API header information, API data structure information, API call notes, an API response format, and API response notes.

The method may further include evaluating a quality of the first set of executable code with respect to at least one from among an accuracy of the first set of executable code, a robustness of the first set of executable code, and a consistency of the first set of executable code.

According to another exemplary embodiment, a computing apparatus for automatically generating software code is provided. The computing apparatus includes a processor; a memory; a display; and a communication interface coupled to each of the processor, the memory, and the display. The processor is configured to: receive, via the communication interface, a first request for performing a first task and a first prompt that includes at least one from among application programming interface (API) information and at least one pre-defined helper function; provide, as an input to a first large language model (LLM), the first request and a response to the first prompt that is received via a user interface (UI); receive, via the communication interface from the first LLM, a first set of executable code that implements a first function that corresponds to a skill that is usable for performing the first task; generate a first test that relates to the first task; perform the first test by executing the first set of executable code and checking whether the first task has been successfully completed; and when the first task has been successfully completed, store the first set of executable code as a skill in a skills library.

The processor may be further configured to: receive, via the communication interface, a second request for performing a second task; provide, as an input to the first LLM, the second request, together with at least one skill from among the skills stored in the skills library; receive, via the communication interface from the first LLM, a second set of executable code that is usable for performing the second task; generate a second test that relates to the second task; perform the second test by executing the second set of executable code and checking whether the second task has been successfully completed; and when the second task has been successfully completed, store the second set of executable code as a solution in a solutions library.

The processor may be further configured to: cause the display to display, via the UI, a list of available solutions that are stored in the solutions library; receive, from a user via the UI and the communication interface, a third request to execute at least one user-selected solution from among the displayed list of available solutions; retrieve instructions that correspond to the at least one user-selected solution; prompt, based on the instructions, the user to provide at least one input that corresponds to at least one item of information required for executing the at least one user-selected solution; receive the at least one input from the user via the UI and the communication interface; execute the at least one user-selected solution by using the at least one input; and transmit, to the user via the communication interface and the UI, a result of the execution of the at least one user-selected solution.

The processor may be further configured to call at least one standard operating procedure (SOP) tool from among a first SOP tool that corresponds to obtaining information that relates to the list of available solutions that are stored in the solutions library; a second SOP tool that corresponds to retrieving a set of executable code that corresponds to a selection from the list of available solutions; a third SOP tool that corresponds to obtaining a description, a set of instructions, and a set of required input parameters that correspond to the selections from the list of available solutions; and a fourth SOP tool that corresponds to executing the set of executable code that corresponds to the selection from the list of available solutions.

The processor may be further configured to call at least one UI tool from among a first UI tool that corresponds to displaying a file upload form via the UI and retrieving an uploaded file based on a response to the displaying of the file upload form; a second UI tool that corresponds to displaying a file download button via the UI and receiving a notification that a file has been downloaded by the user; a third UI tool that corresponds to prompting the user to provide required inputs via the UI; and a fourth UI tool that corresponds to displaying an error message via the UI.

The API information may include at least one from among an API description, a GET API method type, a POST API method type, an API uniform resource locator (URL), API header information, API data structure information, API call notes, an API response format, and API response notes.

The processor may be further configured to evaluate a quality of the first set of executable code with respect to at least one from among an accuracy of the first set of executable code, a robustness of the first set of executable code, and a consistency of the first set of executable code.

According to yet another exemplary embodiment, a non-transitory computer readable storage medium storing instructions for automatically generating software code is provided. The storage medium includes a first set of executable code which, when executed by a processor, causes the processor to: receive a first request for performing a first task and a first prompt that includes at least one from among application programming interface (API) information and at least one pre-defined helper function; provide, as an input to a first large language model (LLM), the first request and a response to the first prompt that is received via a user interface (UI); receive, from the first LLM, a second set of executable code that implements a first function that corresponds to a skill that is usable for performing the first task; generate a first test that relates to the first task; perform the first test by executing the second set of executable code and checking whether the first task has been successfully completed; and when the first task has been successfully completed, store the second set of executable code as a skill in a skills library.

When executed by the processor, the first set of executable code may be further configured to cause the processor to: receive a second request for performing a second task; provide, as an input to the first LLM, the second request, together with at least one skill from among the skills stored in the skills library; receive, from the first LLM, a third set of executable code that is usable for performing the second task; generate a second test that relates to the second task; perform the second test by executing the third set of executable code and checking whether the second task has been successfully completed; and when the second task has been successfully completed, store the third set of executable code as a solution in a solutions library.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
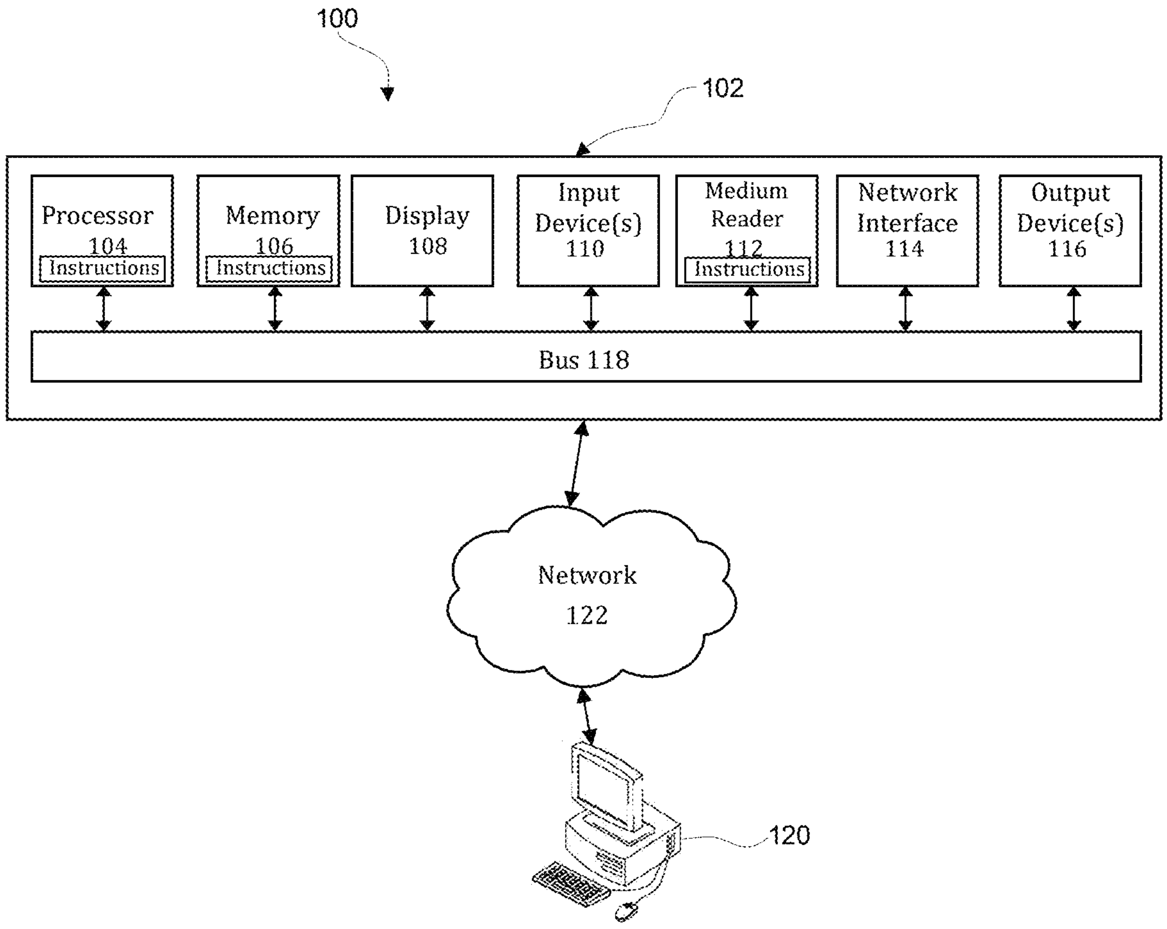
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using an LLM to automatically translate textual instructions into executable software code via skill distillation and composition.

Figure 2:
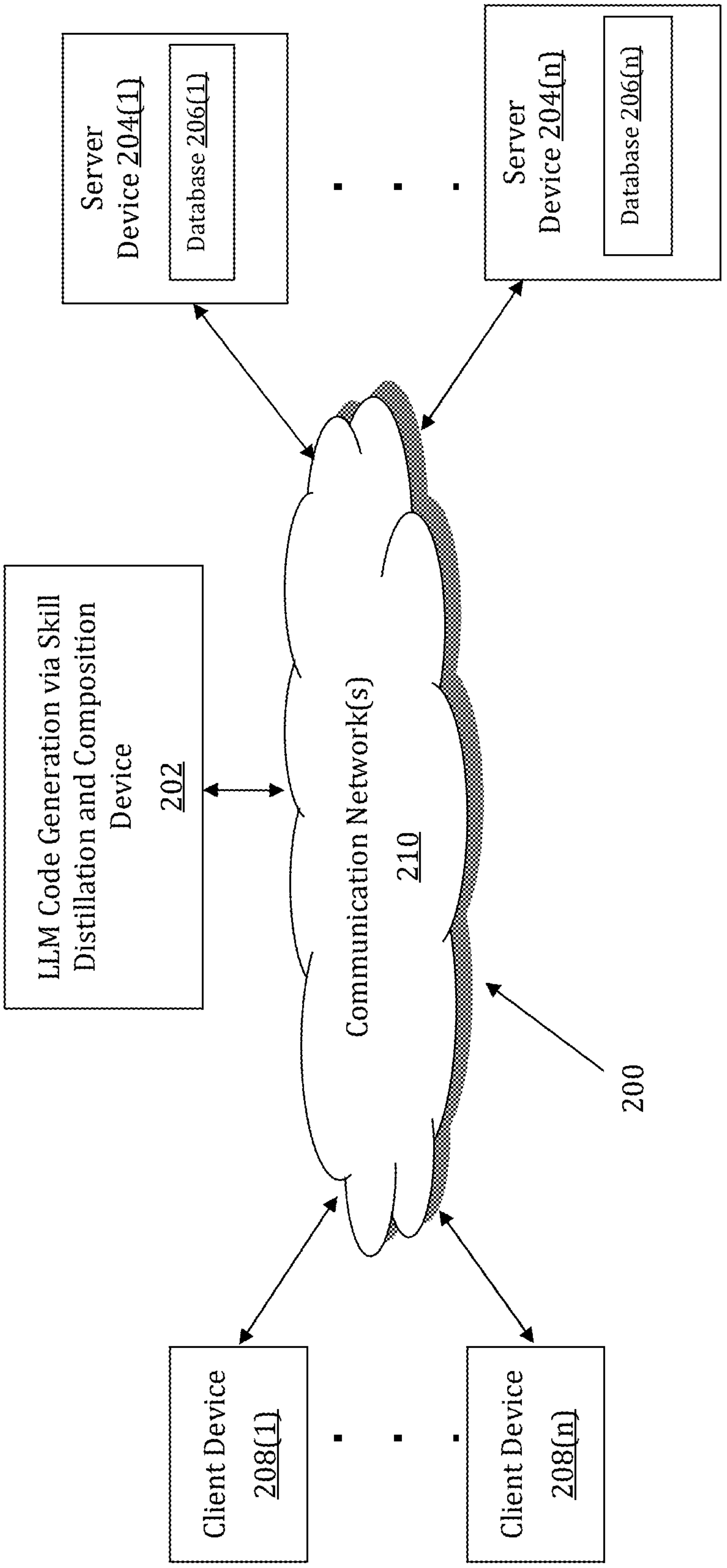
FIG. 2 illustrates an exemplary diagram of a network environment.

Referring to FIG. 2, a schematic of an exemplary network environment 200 for implementing a method for using an LLM to automatically translate textual instructions into executable software code via skill distillation and composition is illustrated. In an exemplary embodiment, the method is executable on any networked computer platform, such as, for example, a personal computer (PC).

The method for using an LLM to automatically translate textual instructions into executable software code via skill distillation and composition may be implemented by an LLM Code Generation via Skill Distillation and Composition (LCGSDC) device 202. The LCGSDC device 202 may be the same or similar to the computer system 102 as described with respect to FIG. 1. The LCGSDC device 202 may store one or more applications that can include executable instructions that, when executed by the LCGSDC device 202, cause the LCGSDC device 202 to perform actions, such as to transmit, receive, or otherwise process network messages, for example, and to perform other actions described and illustrated below with reference to the figures. The application(s) may be implemented as modules or components of other applications. Further, the application (s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LCGSDC device 202 itself, may be located in virtual server(s) running in a cloud-based computing environment rather than being tied to one or more specific physical network computing devices. Also, the application(s) may be running in one or more virtual machines (VMs) executing on the LCGSDC device 202. Additionally, in one or more embodiments of this technology, virtual machine(s) running on the LCGSDC device 202 may be managed or supervised by a hypervisor.

In the network environment 200 of FIG. 2, the LCGSDC device 202 is coupled to a plurality of server devices 204(1)-204(*n*) that hosts a plurality of databases 206(1)-206 (*n*), and also to a plurality of client devices 208(1)-208(*n*) via communication network(s) 210. A communication interface of the LCGSDC device 202, such as the network interface 114 of the computer system 102 of FIG. 1, operatively couples and communicates between the LCGSDC device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LCGSDC device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and LCGSDC devices that efficiently implement a method for using an LLM to automatically translate textual instructions into executable software code via skill distillation and composition.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LCGSDC device 202 may be a standalone device or integrated with one or more other devices or apparatuses, such as one or more of the server devices 204(1)-204(*n*), for example. In one particular example, the LCGSDC device 202 may include or be hosted by one of the server devices 204(1)-204(*n*), and other arrangements are also possible. Moreover, one or more of the devices of the LCGSDC device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204(*n*) in this example may process requests received from the LCGSDC device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206 (*n*) that are configured to store information that relates to LLM-generated code and information that relates to skills that are combinable for performing larger tasks.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the LCGSDC device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the LCGSDC device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the LCGSDC device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LCGSDC device 202, the server devices 204(1)-204(*n*), or the client devices 208(1)-

208(*n*), for example, may be configured to operate as virtual instances on the same physical machine. In other words, one or more of the LCGSDC device 202, the server devices 204(1)-204(*n*), or the client devices 208(1)-208(*n*) may operate on the same physical device rather than as separate devices communicating through communication network(s) 210. Additionally, there may be more or fewer LCGSDC devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
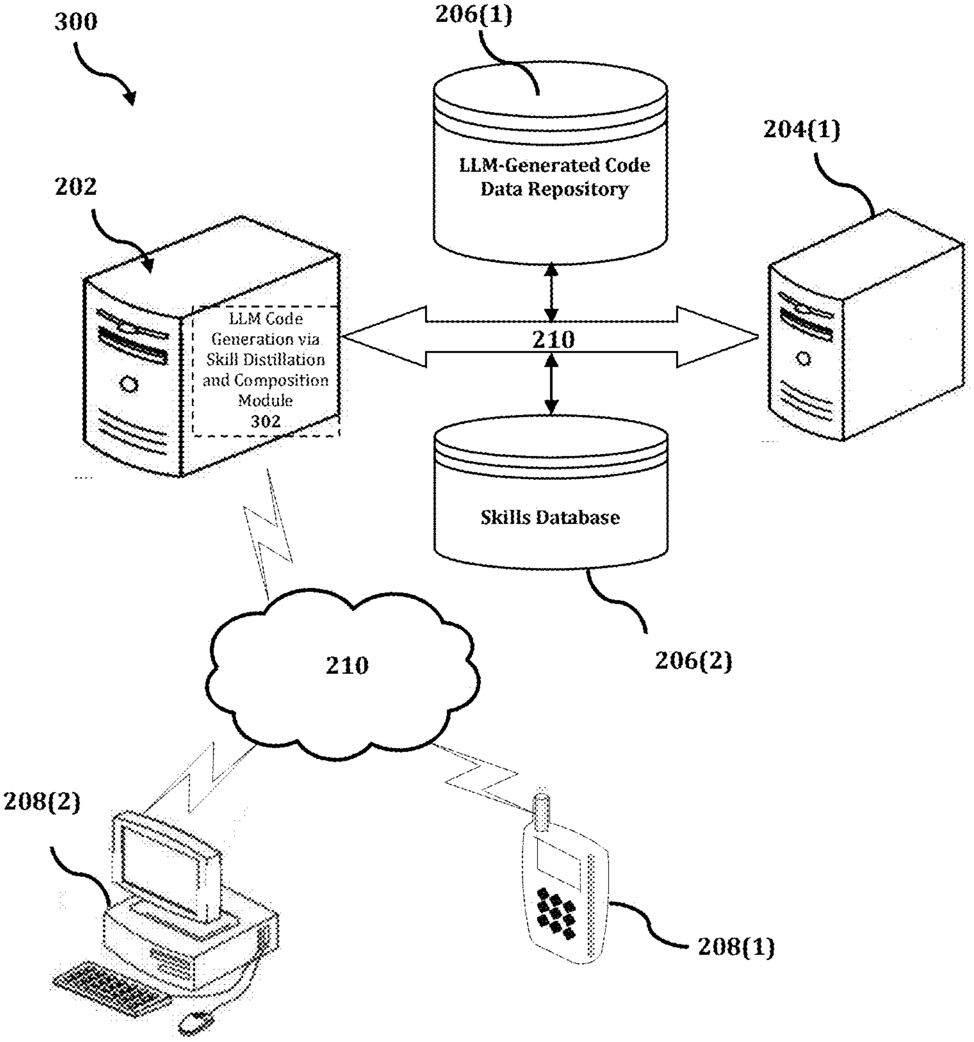
FIG. 3 shows an exemplary system for implementing a method for using an LLM to automatically translate textual instructions into executable software code via skill distillation and composition.

The LCGSDC device 202 is described and illustrated in FIG. 3 as including an LLM code generation via skill distillation and composition module 302, although it may include other rules, policies, modules, databases, or applications, for example. As will be described below, the LLM code generation via skill distillation and composition module 302 is configured to implement a method for using an LLM to automatically translate textual instructions into executable software code via skill distillation and composition.

An exemplary process 300 for implementing a mechanism for using an LLM to automatically translate textual instructions into executable software code via skill distillation and composition by utilizing the network environment of FIG. 2 is illustrated as being executed in FIG. 3. Specifically, a first client device 208(1) and a second client device 208(2) are illustrated as being in communication with LCGSDC device 202. In this regard, the first client device 208(1) and the second client device 208(2) may be "clients" of the LCGSDC device 202 and are described herein as such. Nevertheless, it is to be known and understood that the first client device 208(1) and/or the second client device 208(2) need not necessarily be "clients" of the LCGSDC device 202, or any entity described in association therewith herein. Any additional or alternative relationship may exist between either or both of the first client device 208(1) and the second client device 208(2) and the LCGSDC device 202, or no relationship may exist.

Further, LCGSDC device 202 is illustrated as being able to access an LLM-generated code data repository 206(1) and a skills database 206(2). The LLM code generation via skill distillation and composition module 302 may be configured to access these databases for implementing a method for using an LLM to automatically translate textual instructions into executable software code via skill distillation and composition.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the LCGSDC device 202 via broadband or cellular communication. Of course, these embodiments are merely exemplary and are not limiting or exhaustive.

Upon being started, the LLM code generation via skill distillation and composition module 302 executes a process for using an LLM to automatically translate textual instructions into executable software code via skill distillation and composition. An exemplary process for using an LLM to automatically translate textual instructions into executable software code via skill distillation and composition is generally indicated at flowchart 400 in FIG. 4.

Figure 4:
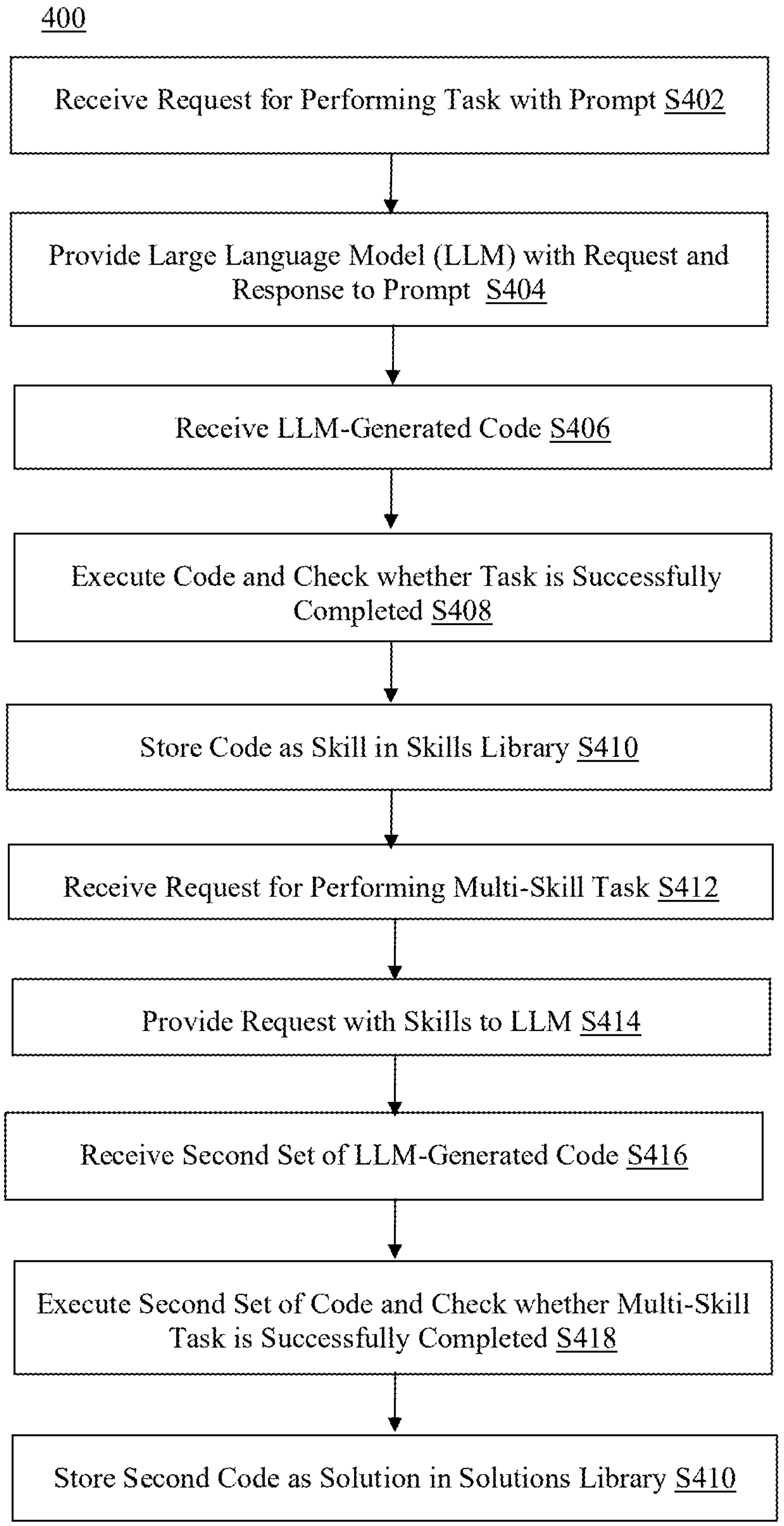
FIG. 4 is a flowchart of an exemplary process for implementing a method for using an LLM to automatically translate textual instructions into executable software code via skill distillation and composition.

In process 400 of FIG. 4, at step S402, the LLM code generation via skill distillation and composition module 302 receives a first request for performing a first task and a prompt that includes either or both of application programming interface (API) information and one or more predefined helper functions. Then, at step S404, the LLM-generated code evaluation module 302 provides an input to an LLM that includes the first request and a response to the prompt. In an exemplary embodiment, the response to the prompt is received from a user via a user interface (UI). In an exemplary embodiment, the API information may include any one or more of an API description, a GET API method type, a POST API method type, an API uniform resource locator (URL), API header information, API data structure information, API call notes, an API response format, and API response notes.

At step S406, the LLM code generation via skill distillation and composition module 302 receives a first set of executable code that implements a function that corresponds to a skill that is usable for performing the first task. Then, at step S408, the LLM code generation via skill distillation and composition module 302 executes the first set of code, in order to determine whether the task is successfully performed. In an exemplary embodiment, the LLM code generation via skill distillation and composition module 302 generates a task-specific test that is designed to facilitate the determination of whether the code is suitable for performing the task, and then checks a result of the execution of the code to make the determination.

When a determination is made that the task has been successfully completed, then at step S410, the LLM code generation via skill distillation and composition module 302 stores the first set of code as a skill in a skills library.

At step S412, the LLM code generation via skill distillation and composition module 302 receives a second request for performing a second task. In an exemplary embodiment, the second task is more complex than the first task, and may be understood as being a standard operating procedure (SOP) task that entails the use of more than one skill from among the skills stored in the skills library.

At step S414, the LLM code generation via skill distillation and composition module 302 provides the second request as an input to the LLM, together with at least one skill from among the skills stored in the skills library. The LLM uses the request and the skills to generate a second set of executable code, and then, at step S416, the LLM code generation via skill distillation and composition module 302 receives the second set of code from the LLM.

At step S418, the LLM code generation via skill distillation and composition module 302 executes the second set of code, in order to determine whether the second task is successfully performed. In an exemplary embodiment, the LLM code generation via skill distillation and composition module 302 generates a task-specific test that is designed to facilitate the determination of whether the code is suitable for performing the second task, and then checks a result of the execution of the code to make the determination. When a determination is made that the second task has been successfully completed, then at step S420, the LLM code generation via skill distillation and composition module 302 stores the second set of code as a solution in a solutions library. In this aspect, each respective solution corresponds to an SOP task that typically requires multiple skills.

In an exemplary embodiment, the LLM code generation via skill distillation and composition module 302 also implements an execution mode by which a user is able to perform an SOP task by accessing the corresponding solution from the solutions library. In an exemplary embodiment, the execution mode may include the following steps: displaying a list of available solutions via a user interface (UI); receiving a request to execute a solution that is selected by the user; retrieving instructions that correspond to the selected solution; using the instructions to prompt the user to provide inputs that correspond to items of information required for executing the selected solution; receiving user input in response to the prompt; executing the selected solution based on the received user input; and transmitting a result of the execution to the user via the UI.

In an exemplary embodiment, some operations of the process 400 may be performed by calling one or more SOP tools and/or by calling one or more UI tools that are available to the LLM code generation via skill distillation and composition module 302. The SOP tools may include, for example, any one or more of a first SOP tool that corresponds to obtaining information that relates to the list of available solutions that are stored in the solutions library; a second SOP tool that corresponds to retrieving a set of executable code that corresponds to a selection from the list of available solutions; a third SOP tool that corresponds to obtaining a description, a set of instructions, and a set of required input parameters that correspond to the selections from the list of available solutions; and a fourth SOP tool that corresponds to executing the set of executable code that corresponds to the selection from the list of available solutions.

In an exemplary embodiment, the UI tools may include, for example, any one or more of a first UI tool that corresponds to displaying a file upload form via the UI and retrieving an uploaded file based on a response to the displaying of the file upload form; a second UI tool that corresponds to displaying a file download button via the UI and receiving a notification that a file has been downloaded by the user; a third UI tool that corresponds to prompting the user to provide required inputs via the UI; and a fourth UI tool that corresponds to displaying an error message via the UI.

In an exemplary embodiment, the LLM code generation via skill distillation and composition module 302 may also implement a code quality evaluation functionality. In particular, the methodology of the present inventive concept may further include evaluating a quality of any of the sets of executable code generated by the LLM with respect to at least one from among an accuracy of the code, a robustness of the code, and a consistency of the code.

SOP tasks involve highly specific, repetitive actions with known outputs and exceptions, which are meticulously documented in a step-by-step manner. These documents serve as an extensive repository of knowledge, encompassing all processes and tasks relevant to the field. A deep understanding of these documents is crucial for all team members engaged in this line of work. However, it is often inefficient for employees to locate information related to their tasks and manually interact with internal UI systems to finish them. Employee attrition further exacerbates this issue of knowledge transfer and sharing, as expertise is lost and must be rebuilt. Accordingly, the present inventive concept aims to 1) empower operations employees to enhance their productivity and advance up the value chain by swiftly finding solutions to address standard/known exceptions and contribute solutions to new problems; 2) ensure resilience to attrition and expedite the onboarding of new employees; and 3) provide adequate support and streamline these processes for system users.

In an exemplary embodiment, a framework that utilizes cutting-edge LLMs to automatically translate textual instructions into executable code, also referred to herein as skills, while interacting with users to apply these generated skills in solving operational tasks is provided. The proposed framework comprises three main components: a skill distillation agent, a skill composition agent, and an execution agent. The present inventive concept provides a capability for translating manual sequential processes into executable code across various software systems. In particular, the present inventive concept is characterized by its ability to achieve skill-reuse and skill-generation through a hierarchical architecture powered by the three LLM-based agents. The skill-reuse capability is crucial as it eliminates redundancy and enhances efficiency, setting it apart from conventional works that generate real-world API function calls from scratch to accomplish a given task. In addition, the overall skill-generation pipeline represents a connection between LLMs and SOP APIs.

Methodology: In an exemplary embodiment, a methodology that relates to how to translate textual instructions into executable while interacting with a human user to query task instructions and necessary information is described below. The system implements a skill distillation functionality and a composition (i.e., skill-reusing) functionality to automatically generate code that executes SOP processes, together with an execution agent that interacts with a user to leverage these skills/solutions to solve a given SOP task.

Skill Distillation Agent: In an exemplary embodiment, a skill is defined as referring to a Python function of solving a sub-task within a comprehensive SOP process. The sub-task may involve a performance of a number of procedures to interact with a specific system. For example, a sub-task may entail checking a broker's information and performing bookings in a system or reading/updating in a spreadsheet.

Figure 5:
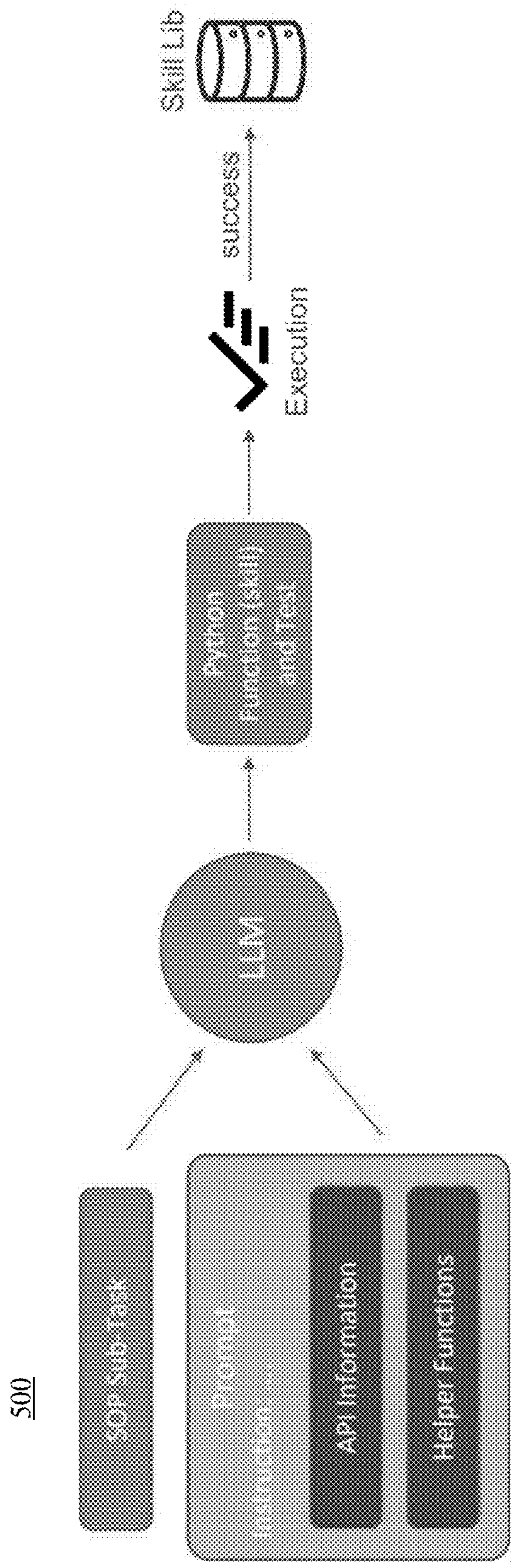
FIG. 5 is an illustration of a workflow of a skill distillation process as implemented in a system for using an LLM to automatically translate textual instructions into executable software code via skill distillation and composition, according to an exemplary embodiment.

FIG. 5 is an illustration 500 of a workflow of a skill distillation process as implemented in a system for using an LLM to automatically translate textual instructions into executable software code via skill distillation and composition, according to an exemplary embodiment.

As shown in FIG. 5, the Skill Distillation agent receives a textual SOP sub-task associated with a particular target system, together with a prompt that may contain relevant API information and/or available pre-defined helper functions (i.e., low-level skills), depending on the target system. The agent then generates a Python function to address the given sub-task, and then creates a test in a Python script for execution. If the generated Python script is executable and successfully completes the SOP task, the defined function is extracted from the script and incorporated into a skills library.

For example, the considered SOPs may be classified into two categories: system-related sub-tasks and spreadsheet-related sub-tasks. For the system component, available API information and helper functions may both be provided, while for the spreadsheet component, only pre-defined helper functions are provided, such as, for example, reading and writing spreadsheets. In an exemplary embodiment, the proposed skill distillation baseline is generalizable to accommodate any targeting systems.

Figure 6:
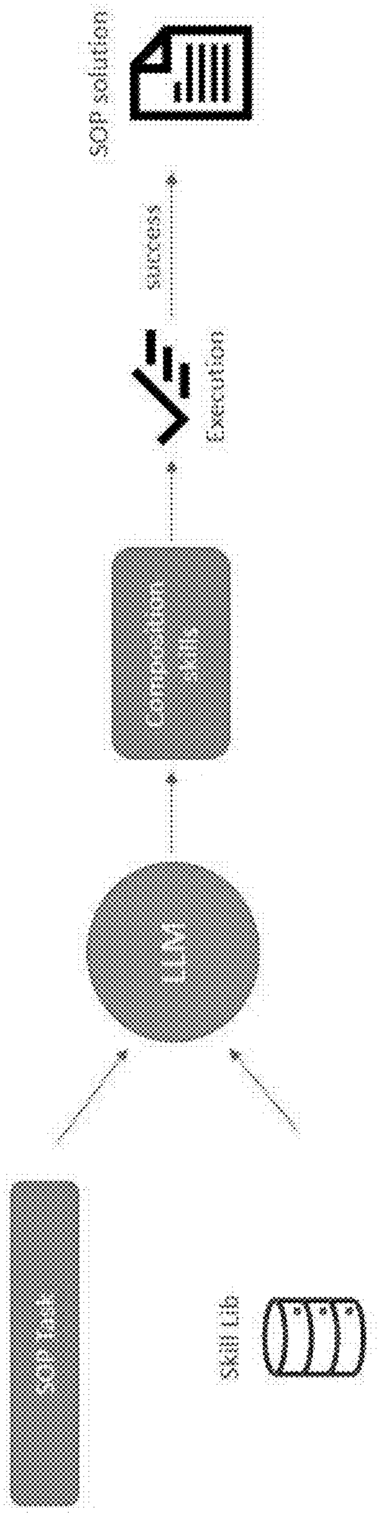
FIG. 6 is an illustration of a workflow of a skill composition process as implemented in a system for using an LLM to automatically translate textual instructions into executable software code via skill distillation and composition, according to an exemplary embodiment.

Skill Composition Agent: FIG. 6 is an illustration 600 of a workflow of a skill composition process as implemented in a system for using an LLM to automatically translate textual instructions into executable software code via skill distillation and composition, according to an exemplary embodiment.

In an exemplary embodiment, once various types of skills have been consolidated into a skills library, the skill composition agent is configured to select and combine them to complete an entire SOP task given the full tasks, as illustrated in FIG. 6. The skill composition agent is capable of composing both system-related skills and spreadsheet-related skills, such as reading and writing, to generate code that automates the process of reading data in spreadsheet, processing the data through system skills, and updating the spreadsheet file if necessary. In an exemplary embodiment, the skill composition agent accomplishes two main tasks: 1) selecting relevant skills from the extensive skills library; and 2) composing the chosen skills to generate code that automates the SOP process. Similarly as described above with respect to the skill distillation process, if the generated SOP solution is successfully executable, the solution is then saved into a higher-level SOP solutions library for use by the execution agent described below.

Execution Agent: In an exemplary embodiment, an execution agent is present in a conversational UI that links input from the user with the SOP task execution. The execution agent has a context that includes a list of messages between the user and the execution agent as well as function calls and responses initiated by the execution agent. The context is initialized by using a setup prompt with instructions of the execution agent's tasks and responsibilities, together with the functions available to the agent. As the session proceeds, new messages are appended to the end of the list.

The execution agent has access to several "tools," or "skills," to aid in its role. These tools may be called at any time by the agent throughout the user interaction session. The execution agent decides which tools to call and when based on the tool descriptions and the state of the current session. The tools can be split into two groups. The first group is SOP tools, which may include the following: 1) get_current_sops—returns a table of SOP task information such as name, status, category, etc.; 2) get_sop_code—returns the Python code for a given SOP; 3) get_sop_instructions—returns the instructions, description and required input parameters for an SOP; and 4) execute_sop—given an SOP name and input values, runs the SOP code and returns the output value. The second group is UI tools, which may include the following: 1) get_file_upload—shows a file upload form in the UI and returns the uploaded file name to the agent; 2) show_file_download—given a file in the session temporary directory, shows a file download button in the UI and informs the agent when the file has been downloaded by the user; 3) get_inputs_from_user—given a list of inputs and descriptions, shows a dynamically generated form in the UI to make data entry simpler and faster; and 4) show_error_message—shows an error message in the UI that stands out to the user more than a standard message.

In an exemplary embodiment, a general flow for a new session where the user wants to execute an SOP may proceed as follows. 1) The execution agent is given a list of the names of available SOPs in the setup prompt. This is how the execution agent lists the available SOPs at the start of every session. 2) The user asks to run a particular SOP. 3) The execution agent retrieves the information on the SOP using the get_sop_instructions tool. This includes: a) SOP description to provide to the user; b) SOP-specific instructions for the execution agent, such as, for example: "after code has run, confirm user has booked value into system"; and c) SOP Python function input parameters. 4) By using this information, the execution agent asks the user to provide the inputs: a) The execution agent can call the get_inputs_from_user tool to display a dynamic form in the UI. b) The user can also enter the values in a standard chat-box input. c) The execution agent may also show a file upload form button. 5) Once the execution agent has all of the required input values, it calls the SOP generated Python function using the execute_sop tool, passing in the inputs. The execution agent makes sure all of the required inputs have been provided before executing the code. 6) The execution agent forwards the returned value or error message from the function to the user and completes any post-execution steps.

Accordingly, with this technology, an optimized process for using an LLM to automatically translate textual instructions into executable software code via skill distillation and composition is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for automatically generating software code, the method being implemented by at least one processor, the method comprising:
- receiving, by the at least one processor, a first request for performing a first task and a first prompt that includes at least one from among application programming interface (API) information and at least one pre-defined helper function;
- providing, by the at least one processor as an input to a first large language model (LLM), the first request and a response to the first prompt that is received via a user interface (UI);
- receiving, by the at least one processor from the first LLM, a first set of executable code that implements a first function that corresponds to a skill that is usable for performing the first task;
- generating, by the at least one processor, a first test that relates to the first task;
- performing the first test by executing the first set of executable code and checking whether the first task has been successfully completed;
- when the first task has been successfully completed, storing the first set of executable code as a skill in a skills library;
- receiving a second request for performing a second task;
- providing, as an input to the first LLM, the second request, together with at least one skill from among the skills stored in the skills library;
- receiving, from the first LLM, a second set of executable code that is usable for performing the second task;
- generating, by the at least one processor, a second test that relates to the second task;
- performing the second test by executing the second set of executable code and checking whether the second task has been successfully completed; and
- when the second task has been successfully completed, storing the second set of executable code as a solution in a solutions library.

2. The method of claim 1, further comprising:
- displaying, via the UI, a list of available solutions that are stored in the solutions library;
- receiving, from a user via the UI, a third request to execute at least one user-selected solution from among the displayed list of available solutions;
- retrieving instructions that correspond to the at least one user-selected solution;
- prompting, based on the instructions, the user to provide at least one input that corresponds to at least one item of information required for executing the at least one user-selected solution;
- receiving the at least one input from the user via the UI;
- executing the at least one user-selected solution by using the at least one input; and
- transmitting, to the user, a result of the executing of the at least one user-selected solution.

3. The method of claim 2, further comprising calling at least one standard operating procedure (SOP) tool from among a first SOP tool that corresponds to obtaining information that relates to the list of available solutions that are stored in the solutions library; a second SOP tool that corresponds to retrieving a set of executable code that corresponds to a selection from the list of available solutions; a third SOP tool that corresponds to obtaining a description, a set of instructions, and a set of required input parameters that correspond to the selection from the list of available solutions; and a fourth SOP tool that corresponds to executing the set of executable code that corresponds to the selection from the list of available solutions.

4. The method of claim 2, further comprising calling at least one UI tool from among a first UI tool that corresponds to displaying a file upload form via the UI and retrieving an uploaded file based on a response to the displaying of the file upload form; a second UI tool that corresponds to displaying a file download button via the UI and receiving a notification that a file has been downloaded by the user; a third UI tool that corresponds to prompting the user to provide required inputs via the UI; and a fourth UI tool that corresponds to displaying an error message via the UI.

5. The method of claim 1, wherein the API information includes at least one from among an API description, a GET API method type, a POST API method type, an API uniform resource locator (URL), API header information, API data structure information, API call notes, an API response format, and API response notes.

6. The method of claim 1, further comprising evaluating a quality of the first set of executable code with respect to at least one from among an accuracy of the first set of executable code, a robustness of the first set of executable code, and a consistency of the first set of executable code.

7. A computing apparatus for automatically generating software code, the computing apparatus comprising:

a processor;

a memory;

a display; and a communication interface coupled to each of the processor, the memory, and the display, wherein the processor is configured to:

receive, via the communication interface, a first request for performing a first task and a first prompt that includes at least one from among application programming interface (API) information and at least one pre-defined helper function;

provide, as an input to a first large language model (LLM), the first request and a response to the first prompt that is received via a user interface (UI);

receive, via the communication interface from the first LLM, a first set of executable code that implements a first function that corresponds to a skill that is usable for performing the first task;

generate a first test that relates to the first task;

perform the first test by executing the first set of executable code and checking whether the first task has been successfully completed;

when the first task has been successfully completed, store the first set of executable code as a skill in a skills library;

receive, via the communication interface, a second request for performing a second task;

provide, as an input to the first LLM, the second request, together with at least one skill from among the skills stored in the skills library;

receive, via the communication interface from the first LLM, a second set of executable code that is usable for performing the second task;

generate a second test that relates to the second task;

perform the second test by executing the second set of executable code and checking whether the second task has been successfully completed; and when the second task has been successfully completed, store the second set of executable code as a solution in a solutions library.

8. The computing apparatus of claim 7, wherein the processor is further configured to:

cause the display to display, via the UI, a list of available solutions that are stored in the solutions library;

receive, from a user via the UI and the communication interface, a third request to execute at least one user-selected solution from among the displayed list of available solutions;

retrieve instructions that correspond to the at least one user-selected solution;

prompt, based on the instructions, the user to provide at least one input that corresponds to at least one item of information required for executing the at least one user-selected solution;

receive the at least one input from the user via the UI and the communication interface;

execute the at least one user-selected solution by using the at least one input; and transmit, to the user via the communication interface and the UI, a result of the execution of the at least one user-selected solution.

9. The computing apparatus of claim 8, wherein the processor is further configured to call at least one standard operating procedure (SOP) tool from among a first SOP tool that corresponds to obtaining information that relates to the list of available solutions that are stored in the solutions library; a second SOP tool that corresponds to retrieving a set of executable code that corresponds to a selection from the list of available solutions; a third SOP tool that corresponds to obtaining a description, a set of instructions, and a set of required input parameters that correspond to the selection from the list of available solutions; and a fourth SOP tool that corresponds to executing the set of executable code that corresponds to the selection from the list of available solutions.

10. The computing apparatus of claim 8, wherein the processor is further configured to call at least one UI tool from among a first UI tool that corresponds to displaying a file upload form via the UI and retrieving an uploaded file based on a response to the displaying of the file upload form; a second UI tool that corresponds to displaying a file download button via the UI and receiving a notification that a file has been downloaded by the user; a third UI tool that corresponds to prompting the user to provide required inputs via the UI; and a fourth UI tool that corresponds to displaying an error message via the UI.

11. The computing apparatus of claim 7, wherein the API information includes at least one from among an API description, a GET API method type, a POST API method type, an API uniform resource locator (URL), API header information, API data structure information, API call notes, an API response format, and API response notes.

12. The computing apparatus of claim 7, wherein the processor is further configured to evaluate a quality of the first set of executable code with respect to at least one from among an accuracy of the first set of executable code, a robustness of the first set of executable code, and a consistency of the first set of executable code.

13. A non-transitory computer readable storage medium storing instructions for automatically generating software code, the storage medium comprising a first set of executable code which, when executed by a processor, causes the processor to:

receive a first request for performing a first task and a first prompt that includes at least one from among application programming interface (API) information and at least one pre-defined helper function;

provide, as an input to a first large language model (LLM), the first request and a response to the first prompt that is received via a user interface (UI);

receive, from the first LLM, a second set of executable code that implements a first function that corresponds to a skill that is usable for performing the first task;

generate a first test that relates to the first task;

perform the first test by executing the second set of executable code and checking whether the first task has been successfully completed;

when the first task has been successfully completed, store the second set of executable code as a skill in a skills library;

receive a second request for performing a second task;

provide, as an input to the first LLM, the second request, together with at least one skill from among the skills stored in the skills library;

receive, from the first LLM, a third set of executable code that is usable for performing the second task;

generate a second test that relates to the second task;

perform the second test by executing the third set of executable code and checking whether the second task has been successfully completed; and when the second task has been successfully completed, store the third set of executable code as a solution in a solutions library.

* * * * *